United States Patent [19]

Daio et al.

[11] Patent Number: 5,582,933

[45] Date of Patent: Dec. 10, 1996

[54] CELL WITH TERMINALS AND CIRCUIT SUBSTRATE

[75] Inventors: Fumio Daio, Nara-ken; Seiichi Mizutani, Hirakata, both of Japan

[73] Assignee: Matsushita Electric Industrial Co., Ltd., Osaka, Japan

[21] Appl. No.: 249,793

[22] Filed: May 25, 1994

[30] Foreign Application Priority Data

Jun. 7, 1993 [JP] Japan .................................. 5-135799
Aug. 30, 1993 [JP] Japan .................................. 5-213693

[51] Int. Cl.$^6$ ................................................. H01M 2/30
[52] U.S. Cl. ........................ 429/178; 429/163; 429/170; 439/754; 439/761
[58] Field of Search ..................... 429/100, 123, 429/163, 170, 178; 439/761, 754, 764

[56] References Cited

U.S. PATENT DOCUMENTS

| 2,506,524 | 5/1950 | Stuck . | |
|---|---|---|---|
| 5,098,802 | 3/1992 | Kainoh | 429/178 |
| 5,230,967 | 7/1993 | Radmall | 429/152 |
| 5,389,466 | 2/1995 | Inoue et al. | 429/178 |

FOREIGN PATENT DOCUMENTS

| 0427976A2 | 5/1991 | European Pat. Off. . |
| 0532301A1 | 3/1993 | European Pat. Off. . |
| 2340464 | 5/1984 | Japan . |
| 60-131753 | 7/1985 | Japan . |

OTHER PUBLICATIONS

Patent Abstracts of Japan, vol. 17, No. 222 (M–1404), 7 May 1993 & JP-A-04 355 191, (Mitsubishi Electric Corp.), 9 Dec. 1992.
Patent Abstracts of Japan, vol. 12, No. 20 (E–575), 21 Jan. 1988 & JP-A-62 177 866, (Matsushita Electric Ind. Co.), 4 Aug. 1987.
Patent Abstracts of Japan, vol. 17, No. 165 (E–1343), 30 Mar. 1993 & JP-A-04 324,242, (Yuasa Battery Co. Ltd.), 13 Nov. 1992.
Patent Abstracts of Japan, vol. 16, No. 417 (E–1258), 3 Sep. 1992 & JP-A-04 141 971, (Mitsubishi Electric Corp.), 15 May 1992.

Primary Examiner—M. Nuzzolillo
Attorney, Agent, or Firm—Watson Cole Stevens Davis, P.L.L.C.

[57] ABSTRACT

In a cell assembly, a cell has terminal elements for attachment to mating terminal elements. Each of the terminal elements has an engaging portion with peripheral ends bent to form an interior region and an first surface with an opening and a projection projecting partially into the interior region from a second surface. The material used has a wall thickness in the range of 0.15–10 mm, a Vickers hardness of 250–450 HV and a spring limit value of 30–60 kgf/mm$^2$. Alternatively, a circuit substrate is provided with such engaging portions.

14 Claims, 5 Drawing Sheets

CELL WITH TERMINALS AND CIRCUIT SUBSTRATE

BACKGROUND OF THE INVENTION

1. Field of the Invention

The present invention relates to a cell with terminals on which the cell can be detachably mounted, and to a circuit substrate.

2. Related Art and Prior Art Statement

Generally, a primary or a secondary cell such as a lithium or alkali cell or the like, having the form of a coin, a button or a cylinder, is frequently used as a backup power source for backing up various memories such as that of an electronic instrument or the like. An arrangement in which terminals are mounted on the cell of this kind by a method of resistance welding, laser welding (YAG laser, excimer laser or $CO_2$ laser) or the like is directly mounted on a circuit substrate by soldering. In this case, an operation for exchanging the cell at the time the service life of the cell is reduced or at the time the guaranteed period of time of the cell service life is reached is troublesome. Further, in view of the need to recycle resources, it is desired to recycle a cell which uses various kinds of metallic oxides and rare metals such as lithium, zinc and the like. For this reason, as disclosed in Japanese Patent Unexamined Publication No. 60-131753 and Japanese Patent Publication No. 3-40464, a cell holder has been used in which a cell can easily be retrieved.

In a case where the cell is mounted on the cell holder and is used in this position, a space for receiving the cell holder into a circuit substrate is required. Particularly, in miniaturized electronic equipment, it is difficult to provide a space for receiving the cell holder within the circuit substrate.

SUMMARY OF THE INVENTION

The present invention intends to solve the above-discussed problems, and an object of the invention is to provide a cell with terminals configured so that exchange of the cell is easy and so that a fixing strength of the cell is excellent, and to provide a circuit substrate with the same advantages.

In order to solve these problems, in the present invention, consideration is applied to a structure and material of a pair of mounting elements and a complementary pair of plate-like terminals to allow attachment of a cell to a circuit substrate. Specifically, for the terminal elements which are mounted on the terminal surfaces of the cell, or for a structure of the mounting elements which are provided on the circuit substrate, a structure is selected having a pair of engaging portions formed by forward end surfaces whose peripheral ends are bent into arcuation so as to form a pair of openings in a first surface, and forward end surfaces of projections, preferably, spherical segments which partially project inwardly in a second surface, so as to receive a pair of terminals which are then urged and fixed by stable firm elasticity or resiliency of the inwardly projecting projections. Thus, the above-discussed problems are solved.

Moreover, a material to be used in the terminal elements, the mounting elements and the terminal elements to be mounted is characterized in that a wall thickness is within a range of 0.15 mm–1.0 mm, a Vickers hardness is equal to or less than 250 HV, as is conventional in material of this kind, and a spring limit or critical value is less than 30 $kgf/mm^2$. However, the cell with terminals or the circuit substrate according to the present invention is arranged such that the Vickers hardness is 250–450 HV, and the spring critical value is 30–60 $kgf/mm^2$ and is made of stainless steel, nickel material, composite material thereof or the like, in which a distance of the engaging spaces in each of the engaging portions is shorter by 0.1–0.5 mm than the wall thickness of the element to be mounted.

By the use of the cell with terminals on which the terminal elements according to the present invention are mounted or the circuit substrate, it is possible to detachably change the cell, and a firm crimp condition due to a spring pressure which is generated by this structure can always be maintained. Thus, the cell with terminals and the circuit substrate are extremely advantageous in economic matters such as handling, recycling and the like.

DETAILED DESCRIPTION OF THE PREFERRED EMBODIMENTS

Hereunder, a first embodiment of the present invention is shown in FIGS. 1 to 5. In this connection, the description will be made with respect to an example of a cell which is provided with a pair of terminal elements according to the present invention on surfaces of respective terminals of the cell.

Figure 1:
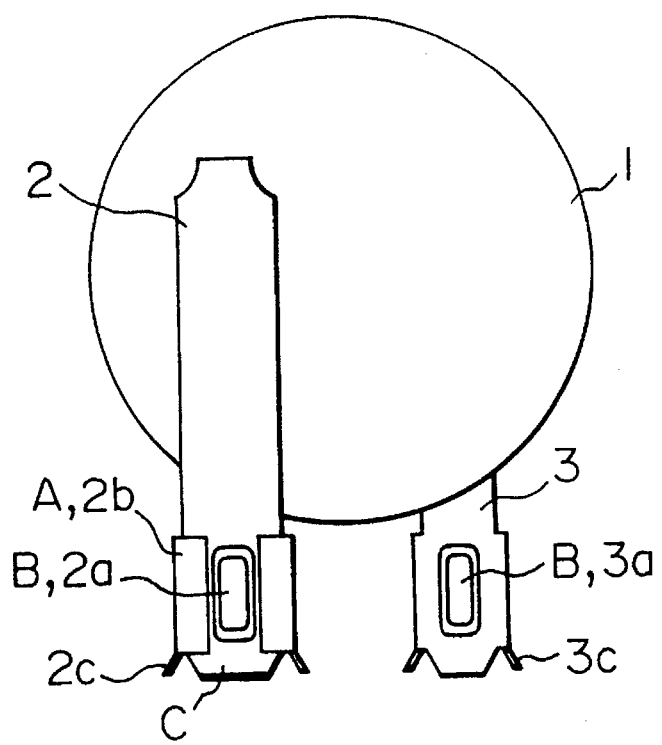
FIG. 1 is a front elevational view showing a coin-shaped cell which is provided with a pair of terminal elements according to a first embodiment of the present invention.
Figure 2:
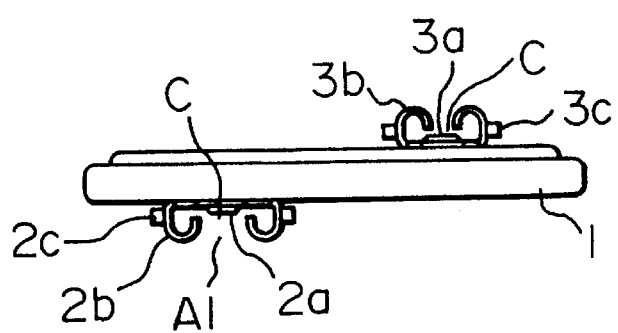
FIG. 2 is a top plan view showing the coin-shaped cell which is provided with the pair of terminal elements according to the first embodiment of the present invention.

FIG. 1 is a front elevational view showing a condition under which terminal elements 2 and 3 according to the present invention are welded and fixed respectively to terminal surfaces of respective positive and negative poles of a coin-shaped lithium cell 1, by means of laser welding. As seen in FIGS. 1 and 2 and in greater detail in cross-section in FIG. 5, the terminal elements 2 and 3 have respective forward ends thereof which define engaging-portion spaces C, respectively, in mating terminals, which are defined respectively by portions 2b and 3b (the latter of which is shown in FIG. 2) bent into the form of an arcuation so as to form openings in first surfaces A, respectively, and projections 2a and 3a partially projecting inwardly in second surfaces B. The reference characters 2c and 3c (shown in FIGS. 1–3) denote terminal inserting guides upon mounting of the terminals of the mating equipment, or positioning guides.

Figure 3:
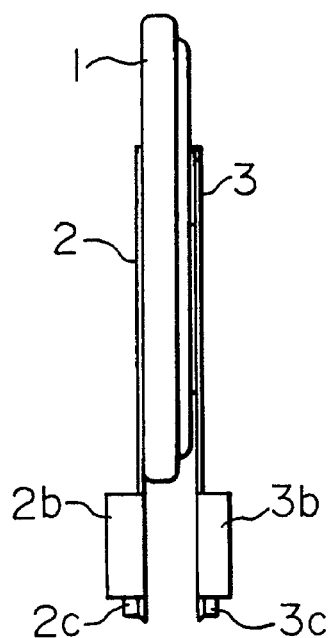
FIG. 3 is a side elevational view showing the coin-shaped cell which is provided with the pair of terminal elements according to the first embodiment of the present invention.

FIG. 2 is a top plan view of FIG. 1, while FIG. 3 is a side elevational view of FIG. 1.

Figure 4:
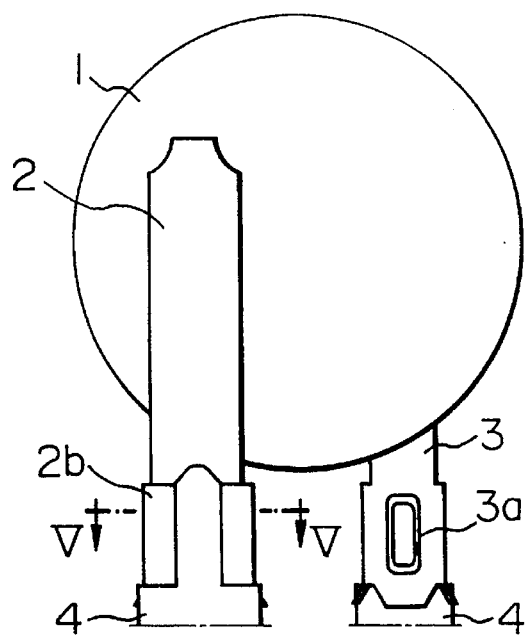
FIG. 4 is a front elevational view of a condition under which a pair of plate-like terminal elements of a mating structure are fitted respectively in the terminal elements according to the first embodiment of the present invention.
Figure 5:
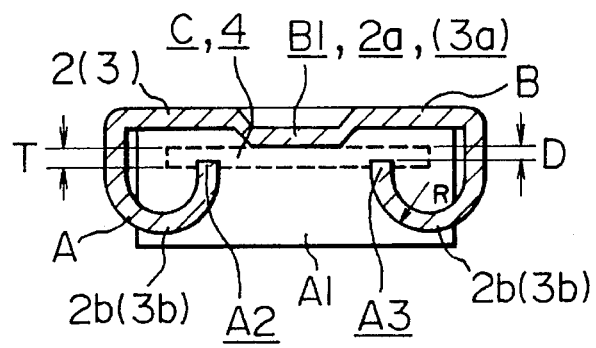
FIG. 5 is a cross-sectional view of a principal portion of a structure according to the first embodiment of the invention under a condition in which the plate-like terminal elements of the mating equipment are fitted respectively in the terminal elements according to the first embodiment of the present invention.
Figure 6:
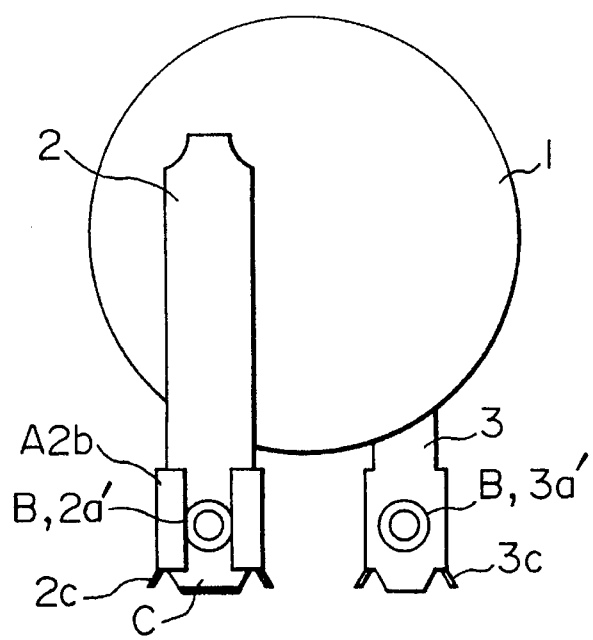
FIG. 6 is a front elevational view showing a coin-shaped cell which is provided with terminal elements according to the second embodiment of the present invention.
Figure 7:
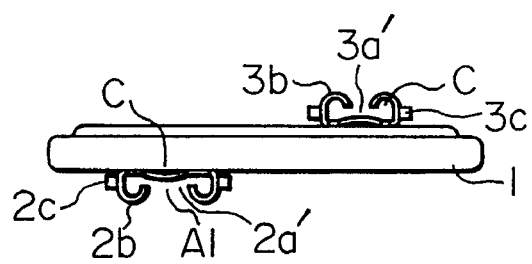
FIG. 7 is a front elevational view showing the coin-shaped cell which is provided with terminal elements according to the second embodiment of the present invention.
Figure 8:
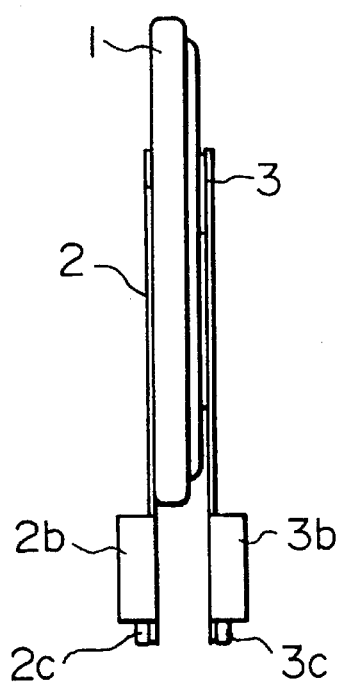
FIG. 8 is a side elevational view showing the coin-shaped cell which is provided with the terminal elements according to the second embodiment of the present invention.
Figure 9:
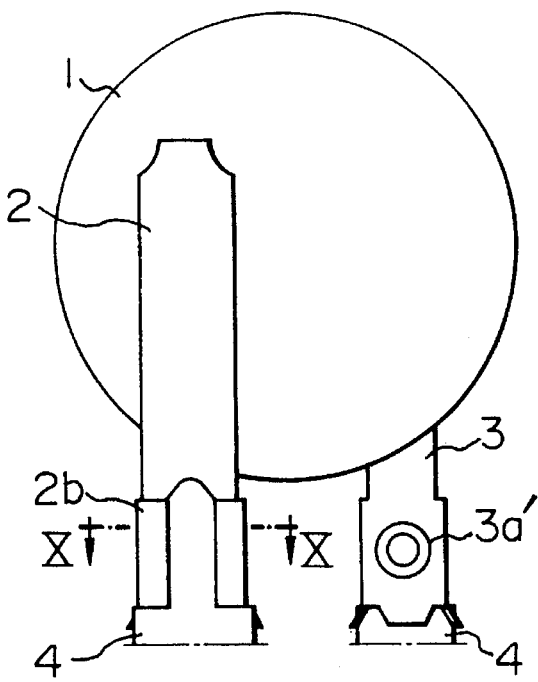
FIG. 9 is a front elevational view of a condition in which a pair of plate-like terminal elements of a mating structure are fitted respectively in a pair of terminal elements according to the second embodiment of the present invention.
Figure 10:
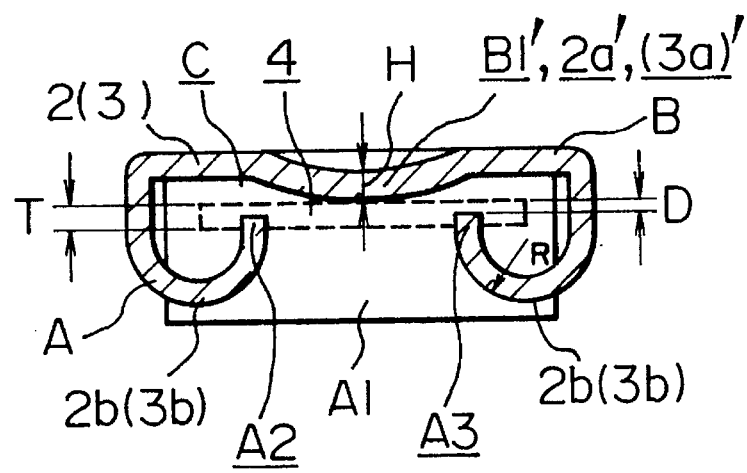
FIG. 10 is a cross-sectional view of a principal portion of a structure according to the second embodiment under a condition in which the plate-like terminal elements of the mating equipment are fitted respectively in the terminal elements.

FIG. 4 is a front elevational view showing a condition at the time a pair of mating plate-like terminal elements 4 are fitted respectively in the engaging-portion spaces C. FIG. 5 is a cross-sectional view taken along a line V—V in FIG. 4. Accordingly, FIG. 5 shows a cross-section of a condition under which the plate-like terminal elements 4 which are provided on the mating equipment are fitted into engagement with terminal elements 2 and 3. The terminal elements 4 are engaged with and fixedly mounted on the terminal elements 2 and 3 according to the present invention and are retained within the engaging-portion spaces C which are defined by forward-end partial surfaces A2 and A3 of the portions 2b and 3b whose peripheral ends are bent into an arcuate form with the same radius of curvature so as to form an opening A1 in one surface A, and a forward-end surface B1 of each of the projections 2a and 3a which partially project inwardly in the other surface B. The terminal elements 4 are held by a spring force exerted by the crimped portions which are so disposed that a spacing between the forward-end partial surfaces A2 and A3 and the forward-end surface B1 of the projection is D, and the wall thickness of each of the mating terminal elements 4 is T, where D and T satisfy a relationship in which T−D≧0.1 and preferably ≧0.5.

The terminal elements according to the present invention are formed by metallic material whose wall thickness is 0.15–1.0 mm, whose Vickers hardness is 250–450 HV, and whose spring elastic modulus is 30–60 kgf/mm². The reason why the wall thickness is 0.15–1.0 mm is as follows. When terminal elements are mounted on terminal surfaces of a cell by a method such as laser welding, resistance welding, ultrasonic welding or the like, great heat generation occurs upon welding in a case where the wall thickness is equal to or more than 1.0 mm. Accordingly, an adverse influence is exerted upon the arranging material within the cell. Further, even if welding can temporarily or provisionally be performed, it is impossible to produce a sufficient welding strength which can bear up to the use to which a structure of this kind is put.

Moreover, when the wall thickness is equal to or less than 0.15 mm, even if the spring elastic modulus is 30–60 kgf/mm², and the Vickers hardness is 250–450 HV as the fixed mounting strength of the terminal elements, there is no problem under normal oscillation conditions. However, under oscillation conditions upon conveyance such as transportation by truck or the like, the cell readily becomes detached because of an insufficient mounting strength. This is not preferable. Furthermore, the Vickers hardness is 250–450 HV and the spring elastic modulus is 30–60 kgf/mm² because material in which the Vickers hardness is less than 250 HV and the spring limit value is less than 30 kgf/mm², as has conventionally been used as terminal material of this kind, is too weak or low in strength for use in the invention. More specifically, in a case of material in which the spring limit value is 30 kgf/mm², repeated mounting and demounting of the cell causes the spring restoring force to be embrittled. In a case where the Vickers hardness is less than 250 HV, for material which is soft upon insertion and demounting of the terminal elements and whose wall thickness is less than 0.15 mm, the terminals are deformed. In a case of material in which the Vickers hardness is equal to or more than 450 HV, since the hardness of the material is too high, upon application of oscillation, the terminal elements are often broken by stress concentration. Further, when the terminal elements are bent into an arcuate form, it is sufficient that, normally, the radius of curvature be of the order of twice the wall thickness. However, processing cannot be performed if the radius of curvature is of the order of five times the wall thickness. This is not preferable in view of space-saving.

Accordingly, for the material of the terminal elements and the material of the terminals to be mounted of this kind, it is required that the material of the terminal elements and the material of the terminals to be mounted be substantially the same in wall thickness as each other, the wall thickness be within a range of from 0.15 mm–1.0 mm, the Vickers hardness be 250–450 HV, and the spring elastic modulus be within a range of from 30–60 kgf/mm².

FIGS. 6 to 10 show a second embodiment according to the present invention. The arrangement of the second embodiment is similar to that of the first embodiment illustrated in FIGS. 1 to 5 except that the projections 2a and 3a which project inwardly in the other surfaces B of the respective forward ends of the terminal elements 2 and 3 are spherical segments 2a' and 3a'. Further, $B_1'$ denotes a forward end surface of each of the spherical segments.

Subsequently, a rate of contact defects in a case where the terminal elements according to the present invention and the conventional material of terminal elements are used to connect up to 100 manganese dioxide lithium cells CR 2020 with terminals as shown in FIG. 1 onto a substrate, the cells being attached and detached 50 times and 500 times, and a rate of occurrence of cell detachment during an oscillation test or experiment under an oscillation experimental condition of MIL-STD-202E are indicated in TABLE 1 and TABLE 2.

TABLE 1 shows experimental results which show the relationship between an engaging-portion spatial distance D according to the present invention and the wall thickness T of the material in a plate-like terminal element when nickel material whose wall thickness is 0.15 mm, whose Vickers hardness is 350 HV and whose spring elastic modulus is 35 kgf/mm$_2$ is used as terminal element material, while TABLE 2 shows the results when nickel material whose wall thickness is 0.5 mm, whose Vickers hardness is 300 HV, and whose spring elastic modulus is 32 kgf/mm² is used. TABLE 3 shows the comparison between (i) terminal element material in which wall thickness of each of the terminal elements to be mounted is 0.3 mm and has a material value according to the present invention, specifically, material whose Vickers hardness is 300 HV, whose spring elastic modulus is 40 kgf/mm² and (ii) conventionally used material, specifically, material whose Vickers hardness is 230 HV and whose spring elastic modulus is 25 kgf/mm². In this connection, either of the terminal element materials comprises stainless steel, and the experiment was carried into practice by a radius of curvature of bent working portions in the form of an arcuation of the terminals which is twice the wall thickness.

TABLE 1

| T - D value | Rate of Occurrence of Contact Defects (%) | | Cell Detachment Rate Due to Oscillation Experiment (%) |
|---|---|---|---|
| | 50 times | 500 times | |
| 1 | 0 | 1 | 3 | 18 |
| 2 | 0.05 | 0 | 3 | 10 |
| 3 | 0.1 | 0 | 0 | 0 |
| 4 | 0.3 | 0 | 0 | 0 |
| 5 | 0.5 | 0 | 0 | 0 |

TABLE 2

| T - D value | Rate of Occurrence of Contact Defects (%) | | Cell Detachment Rate Due to Oscillation Experiment (%) |
|---|---|---|---|
| | 50 times | 500 times | |
| 1 | 0 | 3 | 7 | 35 |
| 2 | 0.05 | 1 | 5 | 20 |
| 3 | 0.1 | 0 | 0 | 0 |
| 4 | 0.3 | 0 | 0 | 0 |
| 5 | 0.5 | 0 | 0 | 0 |

TABLE 3

| | Rate of Occurrence of Contact Defects (%) | | Cell Detachment Rate Due to Oscillation Experiment (%) |
|---|---|---|---|
| | 50 times | 500 times | |
| Article according to the Present Invention | 0 | 0 | 0 |
| Conventional Article | 3 | 25 | 80 |

Further, the present embodiment illustrated in TABLE 3 shows an example in which stainless steel material whose wall thickness is 0.3 mm is used. However, the experiment revealed that, if the material used is not stainless steel, but is one of nickel material, copper material, steel material, phosphor bronze, brass, aluminum copper or the like having physical properties within a range according to the present invention, or composite material such as clad material, or surface-treatment working or processing material, there are provided advantages similar to those of the experiment results shown in TABLES 1–3, and such materials can also be used.

Figure 11:
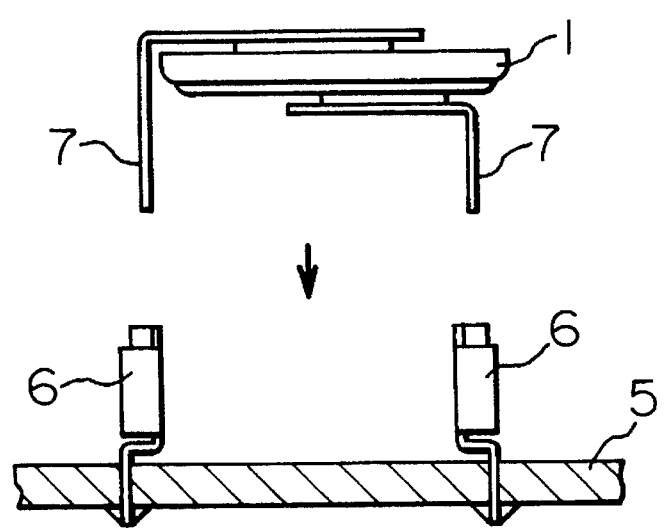
FIG. 11 is a side elevational diagrammatic view showing a third embodiment of the present invention.

In connection with the above, FIG. 11 shows a third embodiment of the present invention, and is a side elevational diagrammatic view showing an example in which a pair of terminal mounting elements 6 according to the present invention are provided on the circuit substrate 5. That is, FIG. 11 shows a cell in which a pair of plate-like terminals 7 are mounted on positive and negative pole terminal surfaces of a cell 1 and are inserted into a pair of terminal mounting elements which are provided on a circuit substrate. Similar experiments show that there can be produced advantages similar to the aforesaid advantages because the arrangement of the terminal mounting elements follows the arrangement of the present invention.

As described above, the invention ensures retention of the cell in the form of a coin, a button, a cylinder, a square shape or the like, by the fact that the mating terminals are clamped within the engaging spaces formed by portions of the terminal elements in which the peripheral ends are bent into an arcuate form so as to form the openings in the first surfaces, and the projections, preferably, the spherical segments which partially project inwardly on the second surfaces, whereby such a force as to be clamped by the firm spring pressure always acts upon the mating terminals. Thus, the present invention is high in resistance to oscillation, can maintain excellent electric contact condition with respect to the mating terminals over a long time, and greatly facilitates disconnection or dismounting and replacement of the cell, because of the portions which abut when the mating terminals are inserted form the projections, preferably, the spherical segments.

What is claimed is:

1. A cell assembly comprising:

a cell with terminal surfaces; and a pair of terminal elements attached to the terminal surfaces of the cell;

wherein each of said terminal elements comprises an engaging portion for receiving one of a pair of mating terminal elements of a device to which the cell assembly is to be attached; and wherein said engaging portion of each of said terminal elements comprises (i) peripheral ends which are bent to from an interior region and a first surface with an opening and (ii) a second surface with a projection projecting partially into the interior region from the second surface;

wherein said terminal elements are characterized as having a wall thickness of 0.15–1.0 mm, a Vickers hardness within a range of 250–450 HV, and a spring limit value within a range of 30–60 kgf/mm².

2. A circuit substrate for receiving terminals of a cell, said substrate comprising:

mounting elements for connecting the circuit substrate to the terminals of the cell, each of the mounting elements comprising an engaging portion for receiving one of said terminals of the cell;

wherein said engaging portion of each of said terminal elements comprises (i) peripheral ends which are bent to form an interior region and a first surface with an opening and (ii) a second surface with a projection projecting partially into the interior region from the second surface;

wherein said mounting elements are characterized as having a wall thickness of 0.15–1.0 mm, a Vickers hardness within a range of 250–450 HV, and a spring limit value within a range of 30–60 kgf/mm².

3. A cell assembly according to claim 1, wherein said projection is a spherical segment.

4. A circuit substrate according to claim 2, wherein said projection is a spherical segment.

5. A cell assembly according to claim 3, wherein said terminal elements are characterized in that a wall thickness is 0.15–1.0 mm, a Vickers hardness is within a range of 250–450 HV, and a spring limit value is within a range of 30–60 kgf/mm².

6. A circuit substrate according to claim 4 wherein said mounting elements of said circuit substrate are characterized in that a wall thickness is 0.15–1.0 mm, a Vickers hardness is within a range of 250–450 HV, and a spring limit value is within a range of 30–60 kgf/mm$^2$.

7. A cell assembly according to claim 1, wherein said terminal elements of said cell with terminals are made of material which is selected from a group consisting of stainless steel, nickel, copper, steel, phosphor bronze, brass, aluminum copper, composite material thereof, and surface treated processing material thereof.

8. A cell assembly according to claim 3, wherein said terminal elements of said cell with terminals are made of material which is selected from a group consisting of stainless steel, nickel, copper, steel, phosphor bronze, brass, aluminum copper, composite material thereof, and surface treated processing material thereof.

9. A circuit substrate according to claim 2, wherein said mounting elements of said circuit substrate are made of material which is selected from a group consisting of stainless steel, nickel, copper, steel, phosphor bronze, brass, aluminum copper, composite material thereof, and surface treated processing material thereof.

10. A circuit substrate according to claim 4, wherein said mounting elements of said circuit substrate are made of material which is selected from a group consisting of stainless steel, nickel, copper, steel, phosphor bronze, brass, aluminum copper, composite material thereof, and surface treated processing material thereof.

11. A cell assembly according to claim 1, wherein:

said projection and said peripheral ends define a gap of thickness D within said interior region;

each of said mating terminal elements has a thickness T; and

T–D is greater than or equal to a value in the range of 0.1–0.5 mm.

12. A cell assembly according to claim 3, wherein:

said projection and said peripheral ends define a gap of thickness D within said interior region;

each of said mating terminal elements has a thickness T; and

T–D is greater than or equal to a value in the range of 0.1–0.5 mm.

13. A circuit substrate according to claim 2, wherein:

said projection and said peripheral ends define a gap of thickness D within said interior region;

each of said terminals of the cell has a thickness T; and

T–D is greater than or equal to a value in the range of 0.1–0.5 mm.

14. A circuit substrate according to claim 4, wherein:

said projection and said peripheral ends define a gap of thickness D within said interior region;

each of said terminals of the cell has a thickness T; and

T–D is greater than or equal to a value in the range of 0.1–0.5 mm.

* * * * *